C. E. CHRISTOPHEL.
COMBING PILE FEEDER.
APPLICATION FILED SEPT. 19, 1917.

1,301,543.

Patented Apr. 22, 1919.
12 SHEETS—SHEET 1.

Inventor
Carl E. Christophel

Attorneys

C. E. CHRISTOPHEL.
COMBING PILE FEEDER.
APPLICATION FILED SEPT. 19, 1917.

1,301,543.

Patented Apr. 22, 1919.
12 SHEETS—SHEET 10.

Inventor
Carl E. Christophel
By his Attorneys

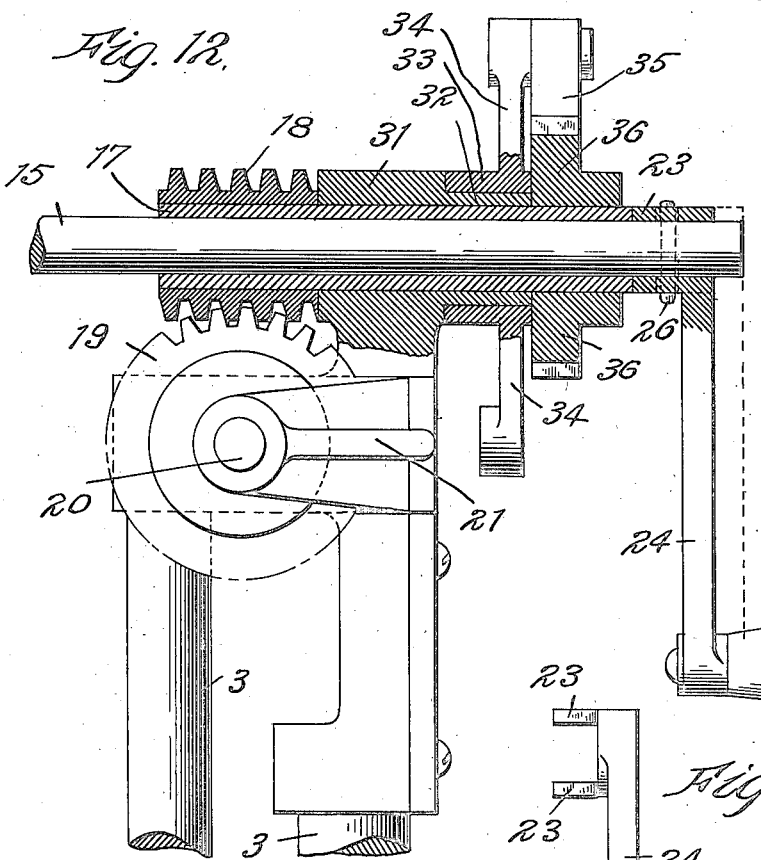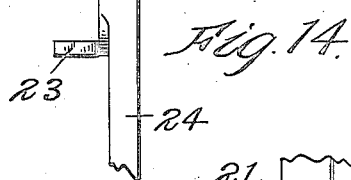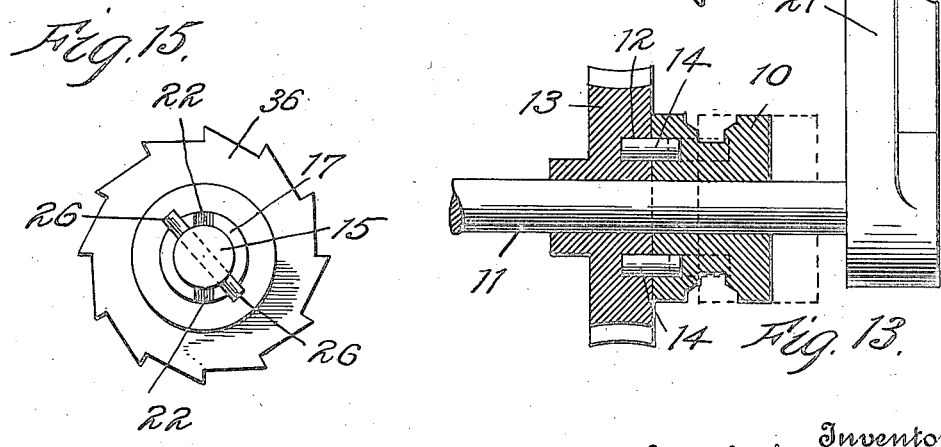

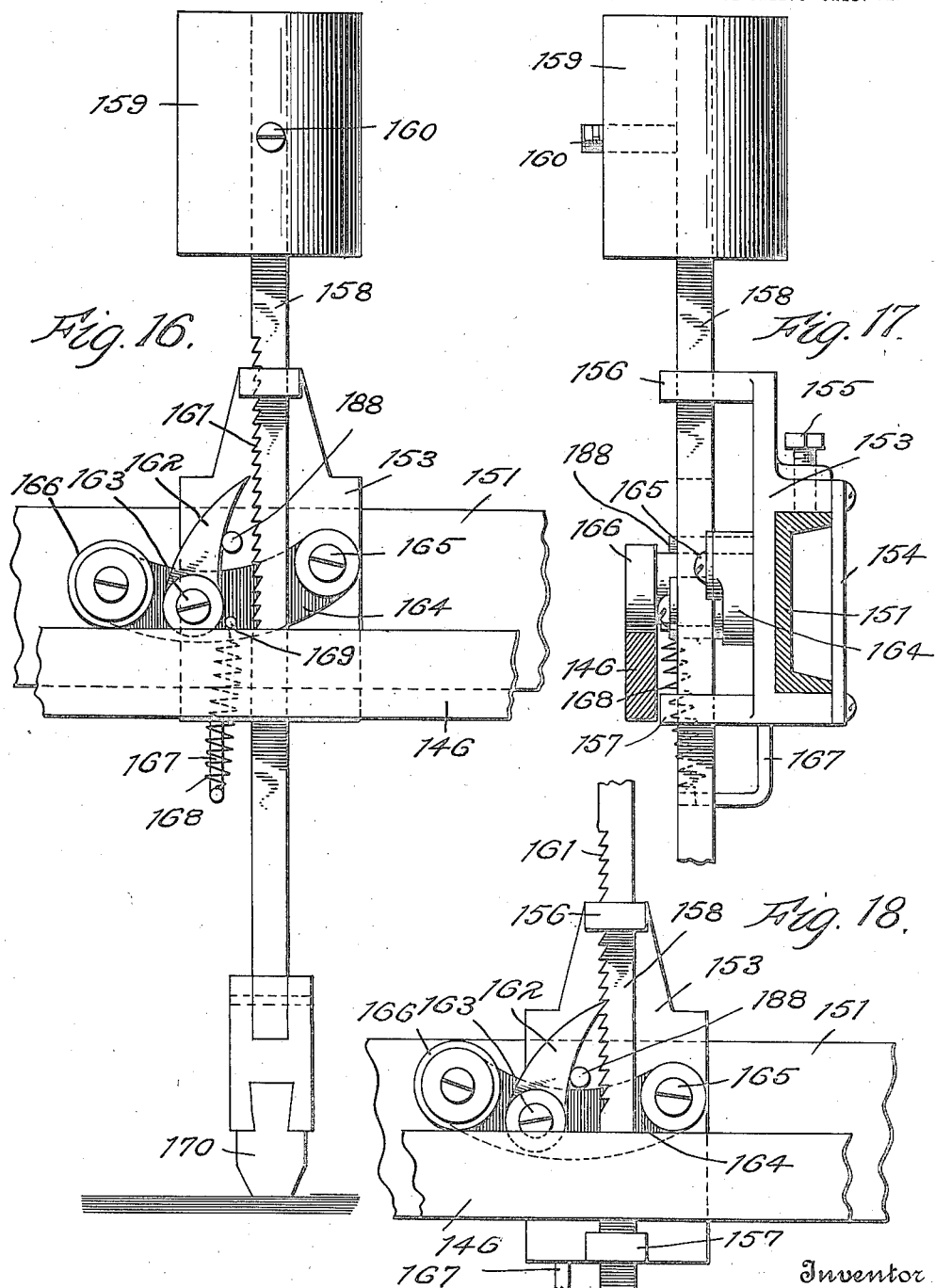

UNITED STATES PATENT OFFICE.

CARL E. CHRISTOPHEL, OF PEARL RIVER, NEW YORK, ASSIGNOR TO DEXTER FOLDER COMPANY, OF PEARL RIVER, NEW YORK, A CORPORATION OF NEW YORK.

COMBING PILE-FEEDER.

1,301,543.      Specification of Letters Patent.      Patented Apr. 22, 1919.

Application filed September 19, 1917. Serial No. 192,105.

*To all whom it may concern:*

Be it known that I, CARL E. CHRISTOPHEL, a subject of the German Emperor, residing at Pearl River, county of Rockland, and State of New York, have invented certain new and useful Improvements in Combing Pile-Feeders, of which the following is a specification.

This invention relates to combing pile feeders and has for its primary object to provide an improved construction, combination and arrangement of parts in a machine of this character. One of the objects of my invention is to provide an improved construction for a combing pile feeder according to which the various operations of the machine are placed more directly under the control of the combing device or combing devices, in such a manner that when the sheet-combing operation becomes retarded by reason of the top of the pile becoming low, automatic means for raising the pile are thrown into action to bring the top of said pile into a position in which desired feeding efficiency is to be obtained. A further object is to provide improved means for regulating the sheet-feeding action by means of the period of time consumed by the top sheet in reaching a sheet-actuated device which controls the sheet-combing device. Another object is to provide improved means for accomplishing the control of the sheet-combing device by means of a sheet-actuated device. Another object is to provide improved means for controlling the pile-elevating mechanism by means of the upward movements of the sheet-combing device. Another object is to provide improved means whereby the pressure of the combing wheel is distributed between portions of the top sheets of a pile which are disposed over said pile or over a fixed feed board or plate. Other and further objects will appear in the specification and be pointed out in the claims, reference being had to the accompanying drawings which exemplify my invention in its preferred embodiment.

In the drawings,—

Fig. 12 is a rear elevation of the crank operated mechanism for raising and lowering a pile-carrying table, parts being broken away and parts shown in section;

Fig. 13 is an axial section through the worm wheel and chain drive connection for driving the pile-carrying table, parts being shown in plan;

Fig. 14 is a fragmentary plan view of the crank end of the same;

Fig. 15 is a side elevation of the ratchet and shaft carrying the same;

Fig. 16 is a side elevation of the tail drag in its lowered position, parts being broken away;

Fig. 17 is a front elevation of the upper end of the same, parts being broken away and parts shown in section;

Fig. 18 is a fragmentary side elevation of the tail drag in raised position.

Figure 1:
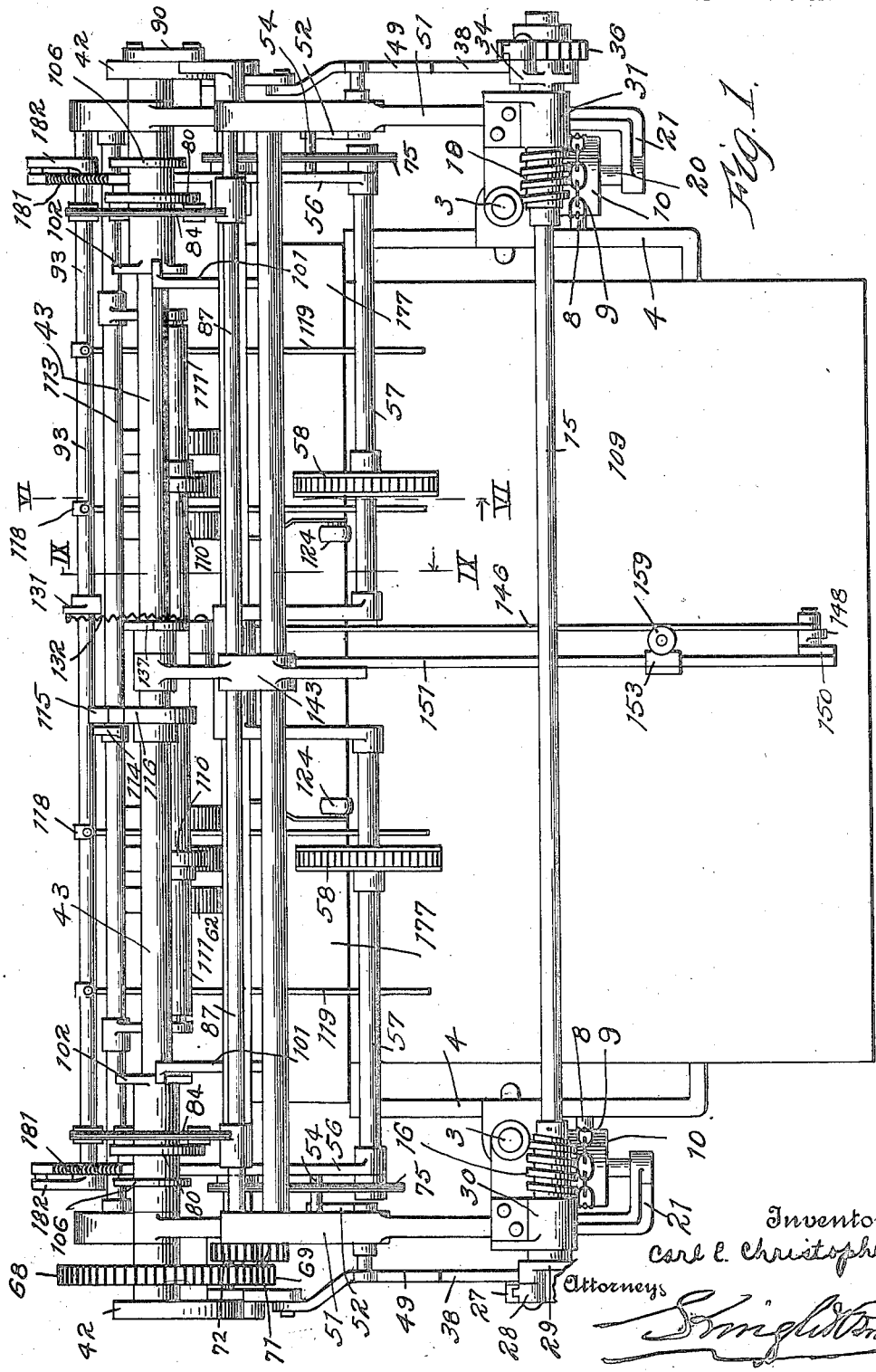
Figure 1 is a top plan view of the preferred embodiment of my invention.
Figure 2:
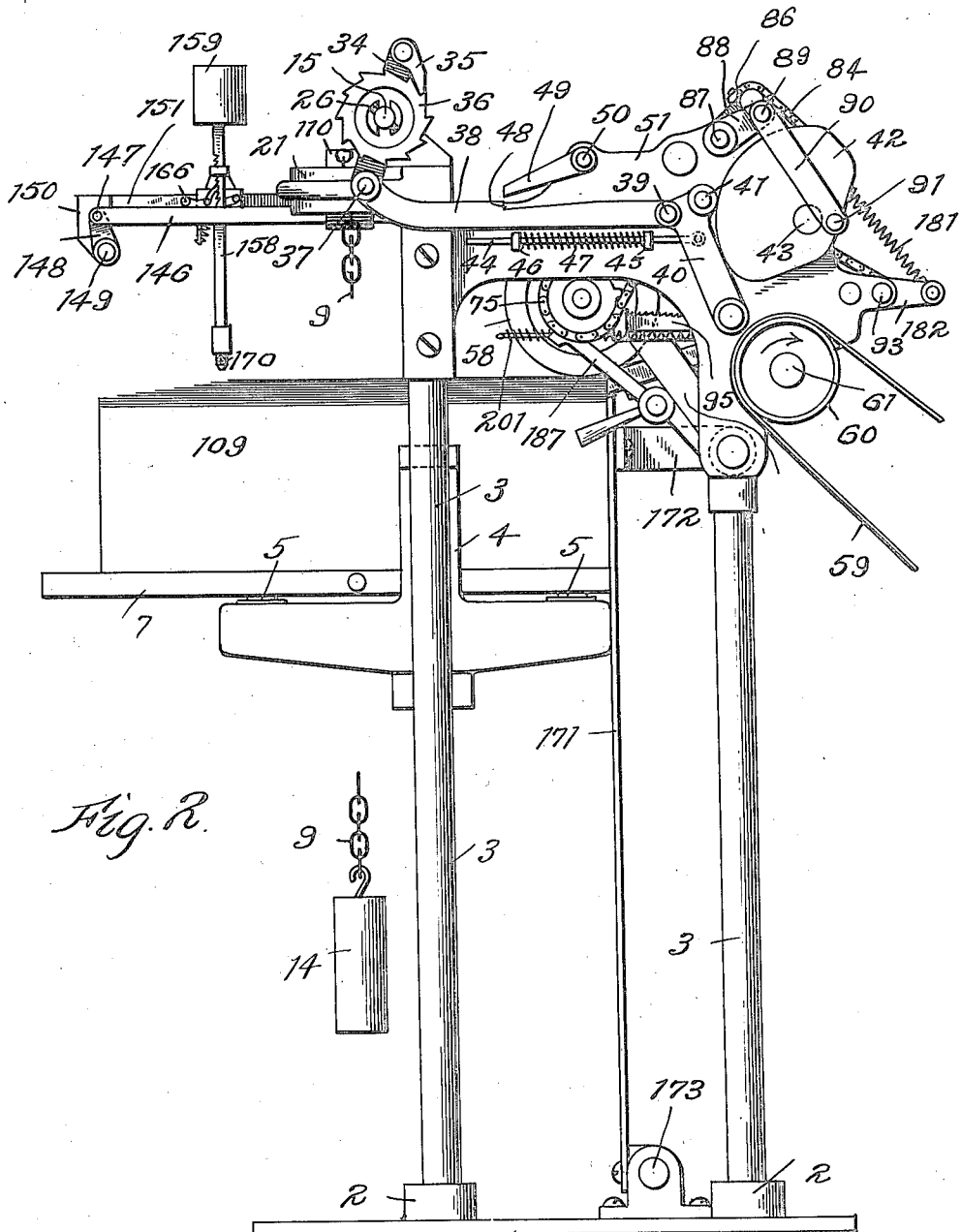
Fig. 2 is a side elevation of the same from the right of Fig. 1.
Figure 3:
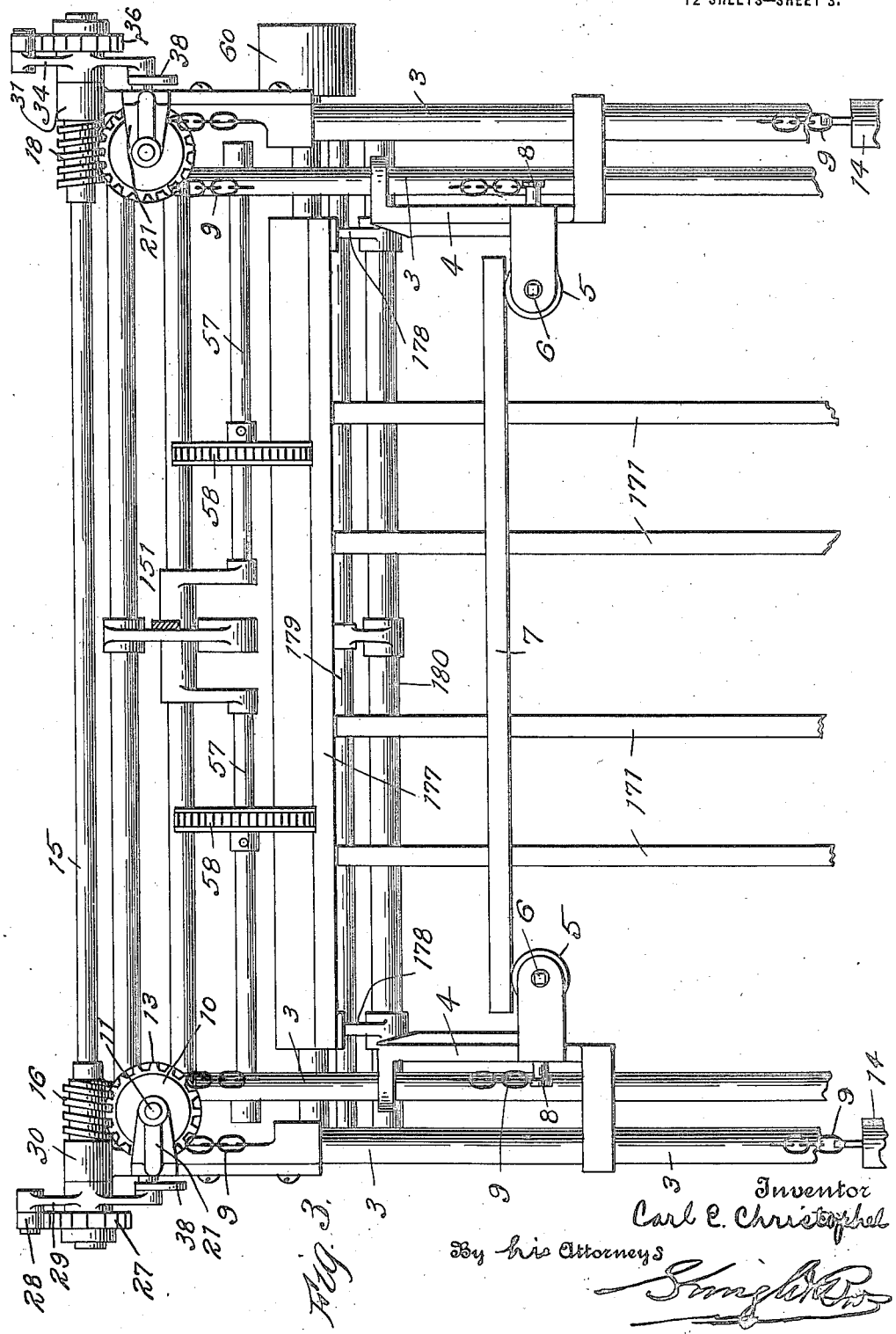
Fig. 3 is a rear elevation of the same.
Figure 4:
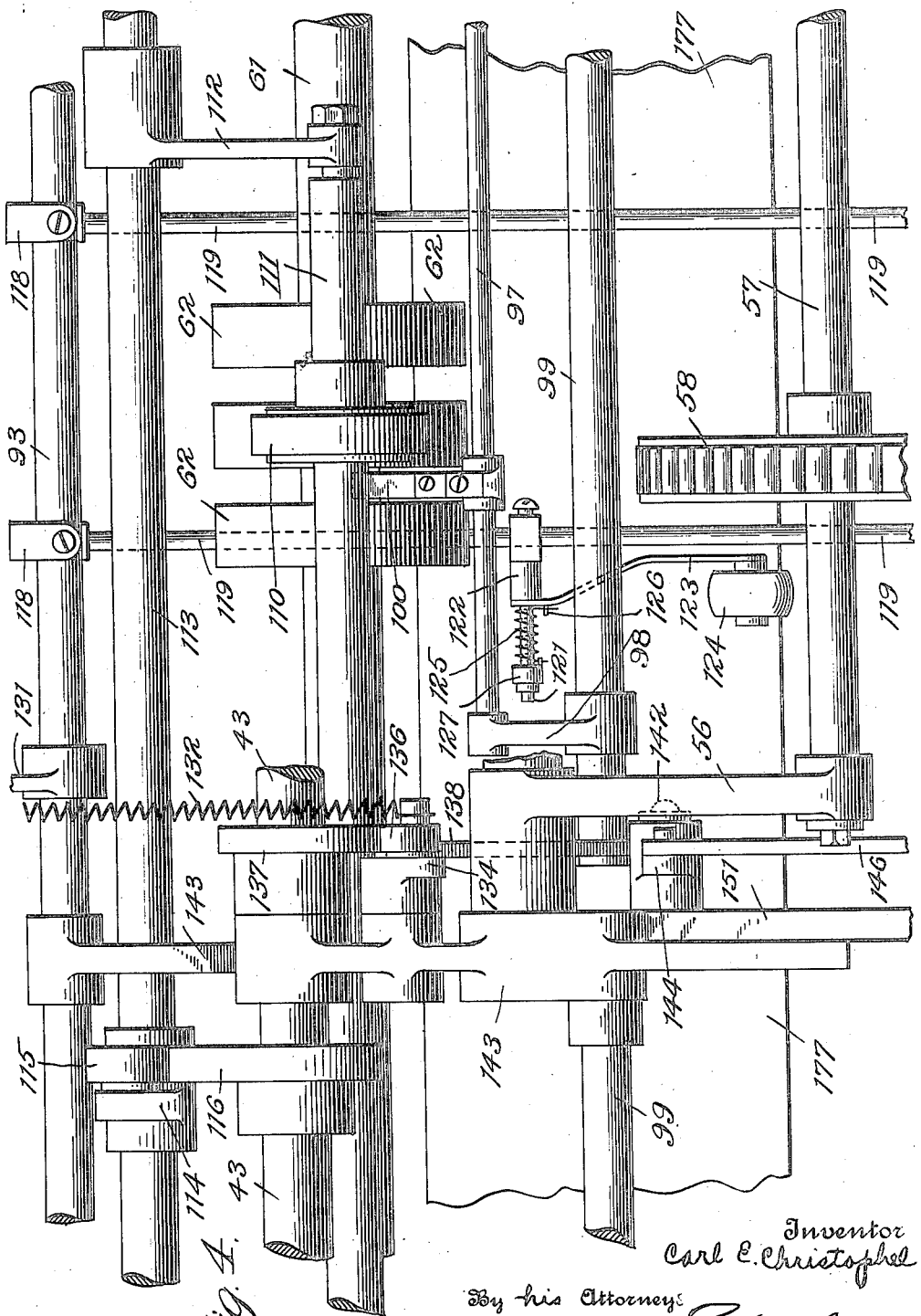
Fig. 4 is a top plan view on an enlarged scale of a portion of one of the combing feeders, parts being broken away and parts shown in section.
Figure 5:
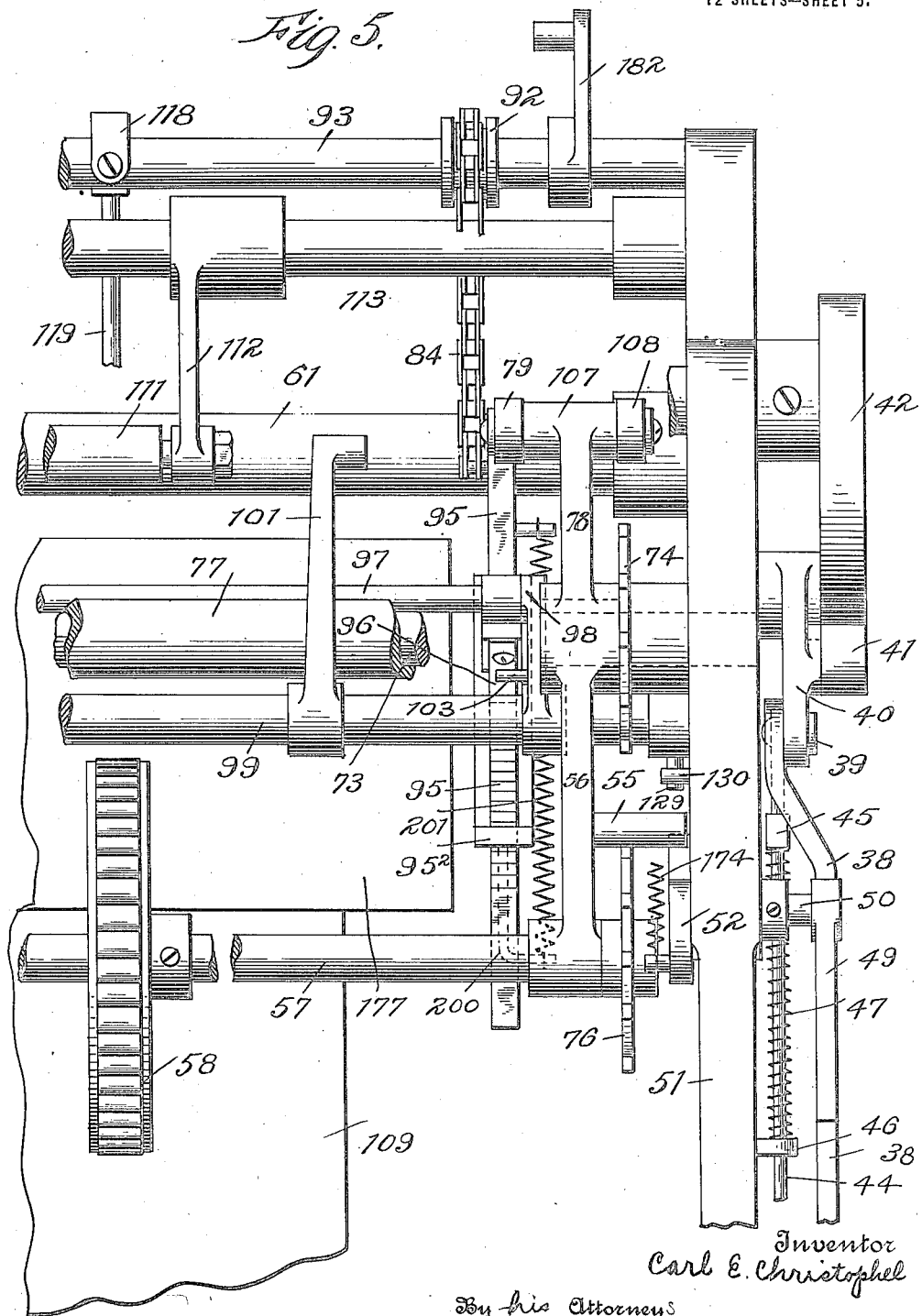
Fig. 5 is a top plan view on an enlarged scale of the right hand end of the machine, parts being broken away and parts shown in section.
Figure 6:
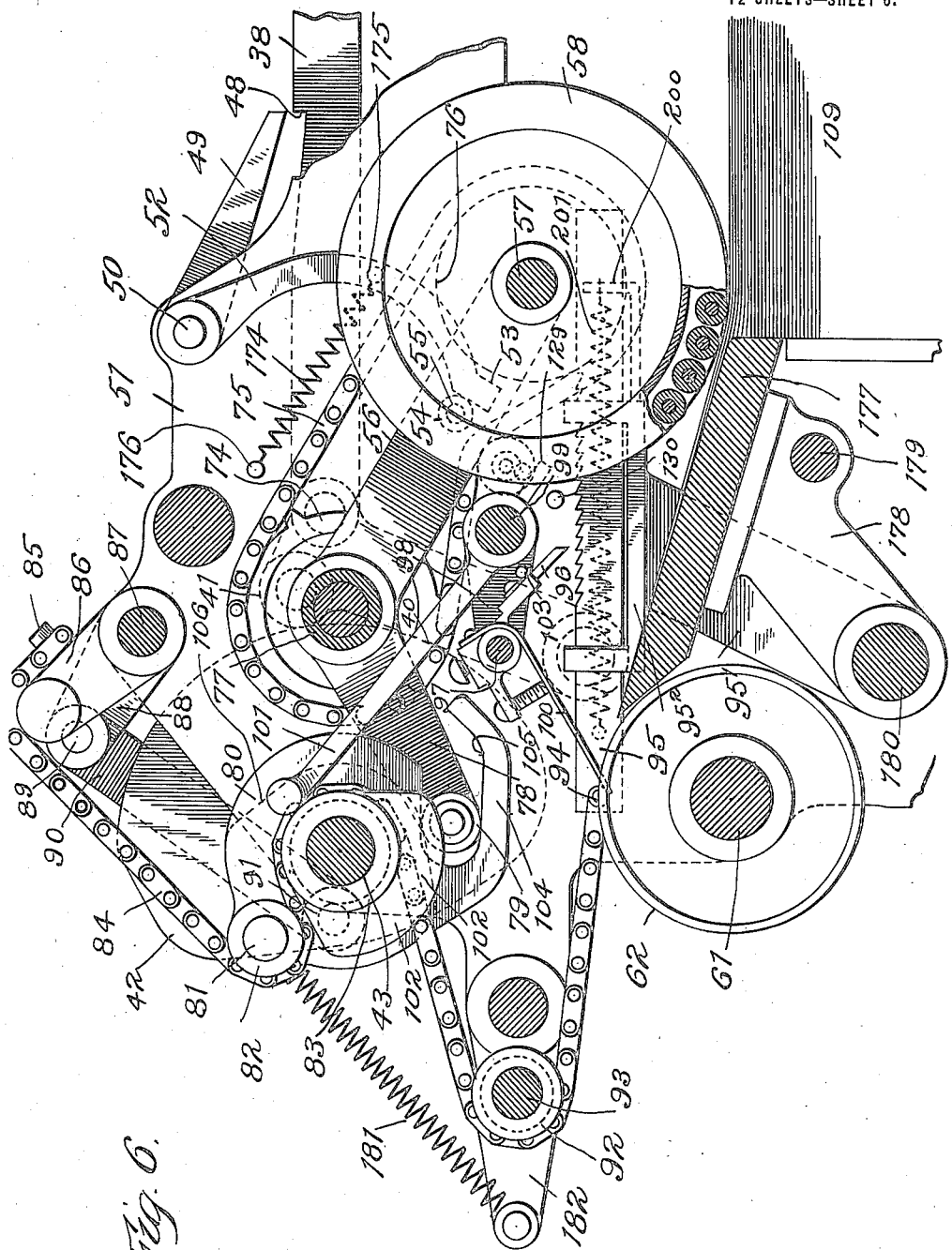
Fig. 6 is a section on an enlarged scale on the line VI—VI, Fig. 1.
Figure 7:
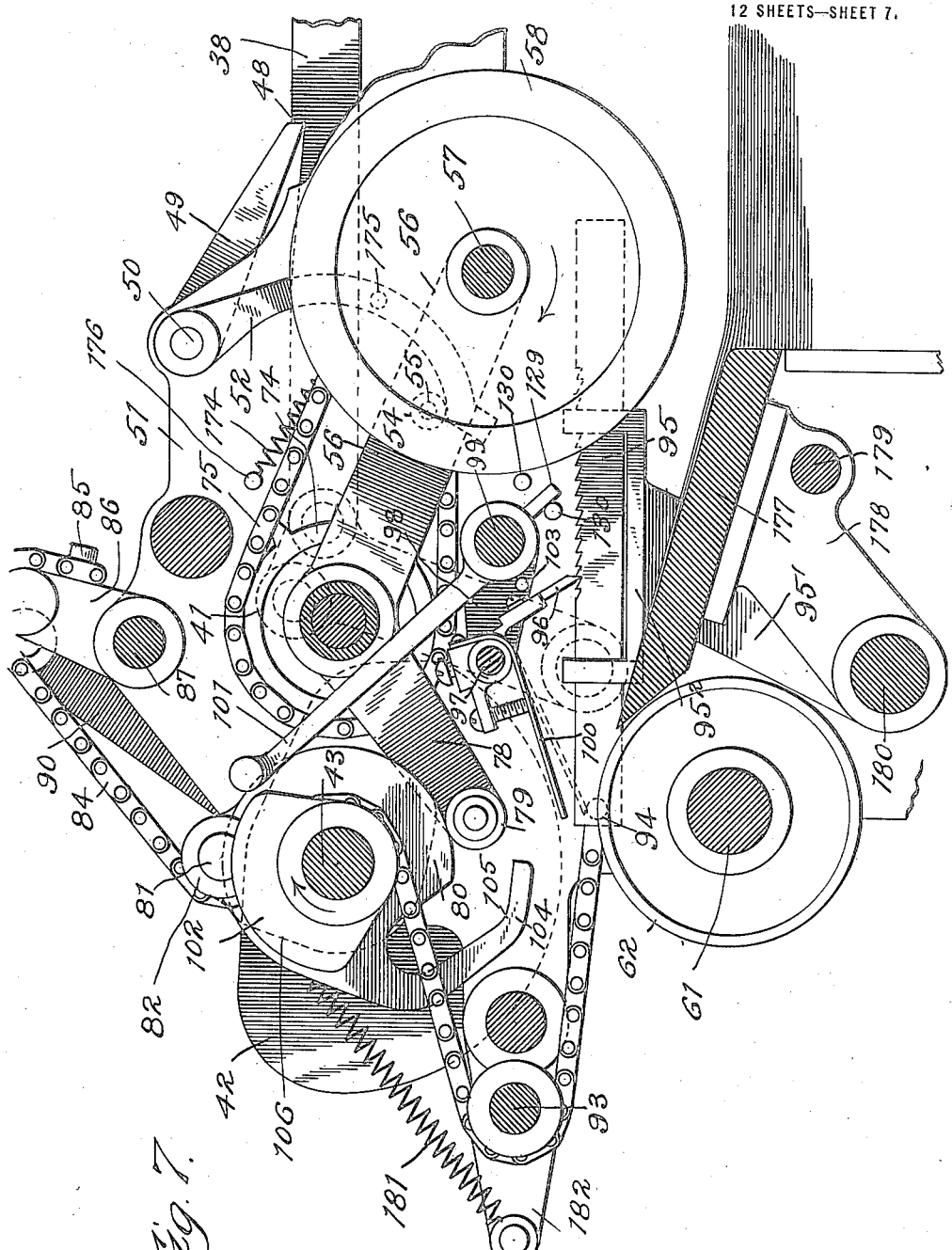
Fig. 7 is a similar section showing the parts in different positions.
Figure 8:
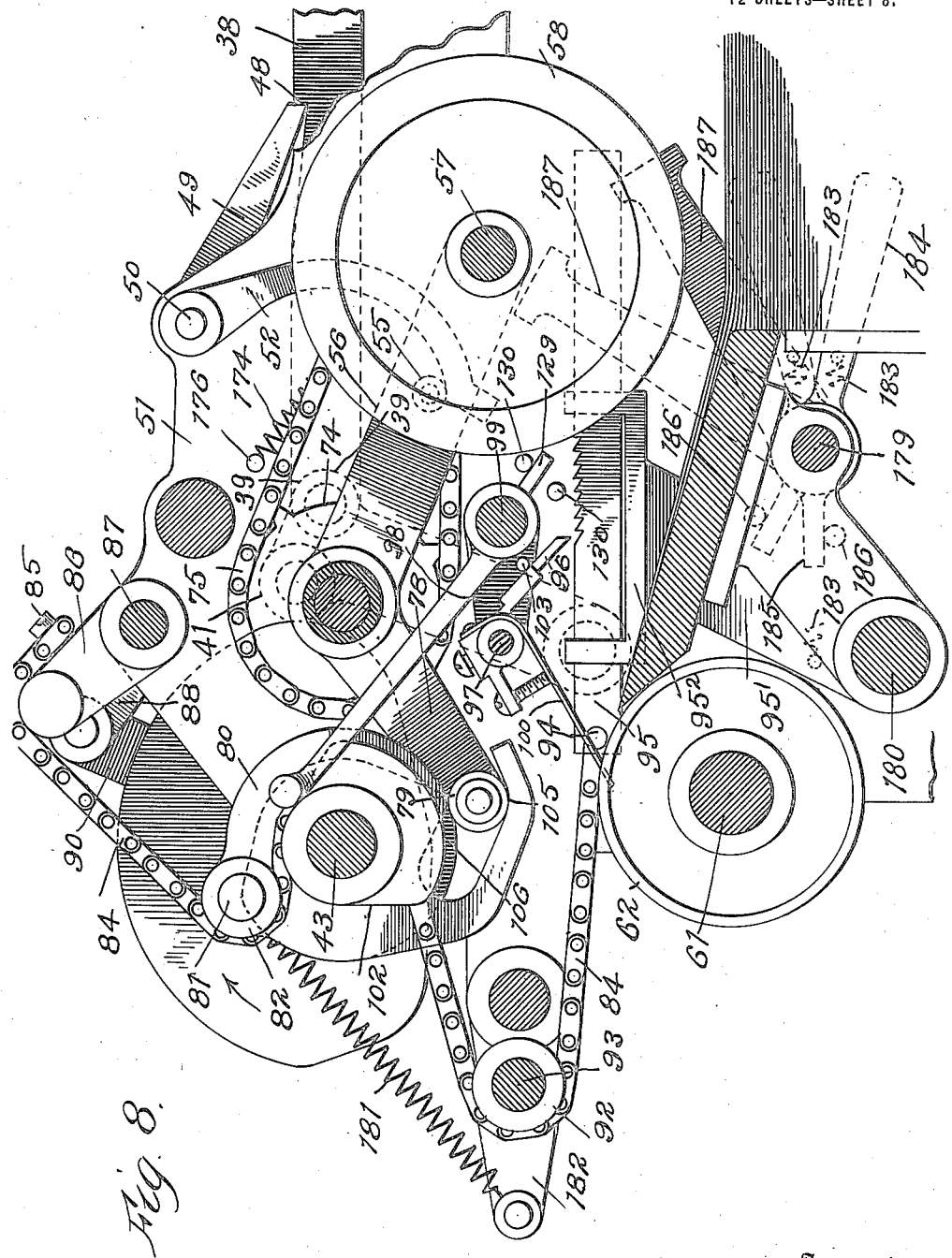
Fig. 8 is a similar section showing further changes in the positions of the parts.
Figure 9:
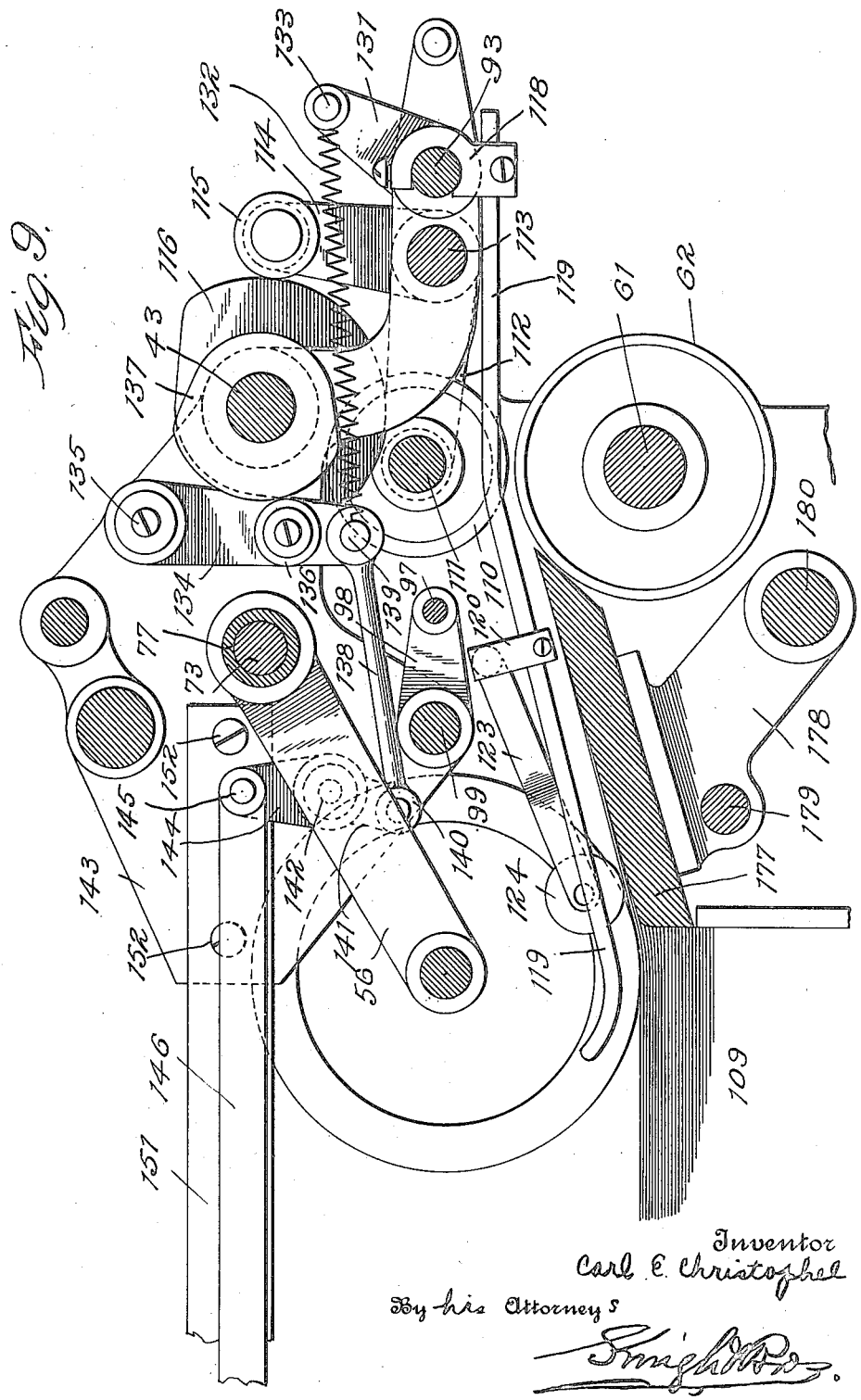
Fig. 9 is a section on an enlarged scale on the line IX—IX, Fig. 1.
Figure 10:
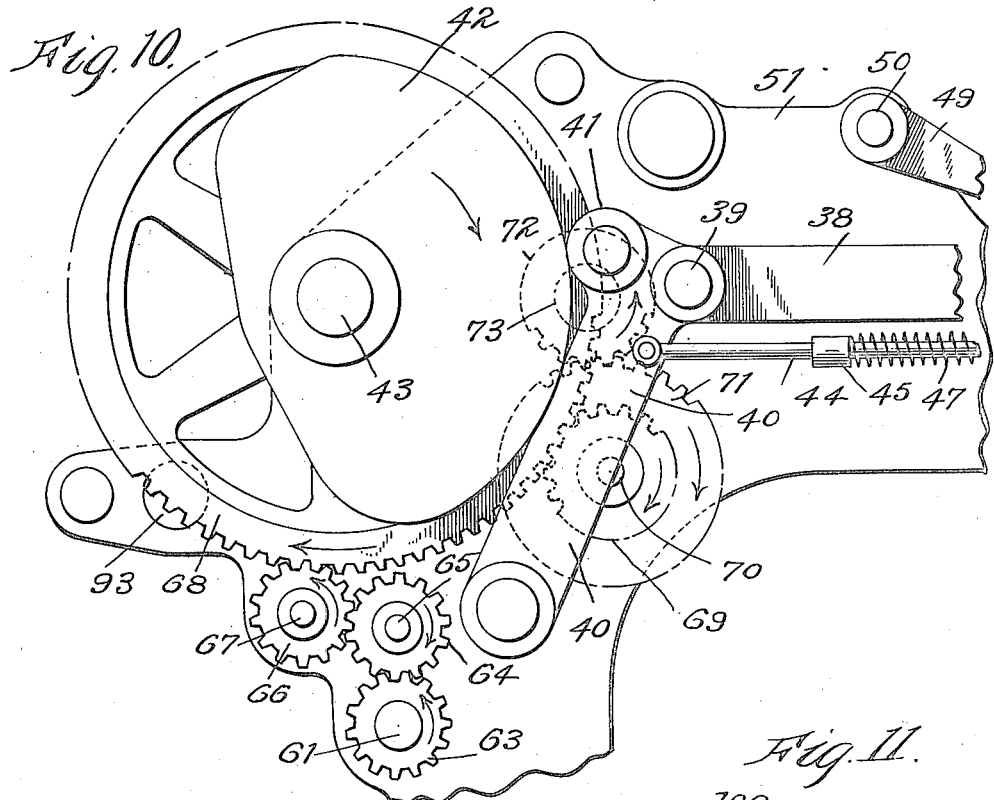
Fig. 10 is a side elevation on an enlarged scale of the upper part of the machine taken from the left of Fig. 1, parts being broken away.
Figure 11:
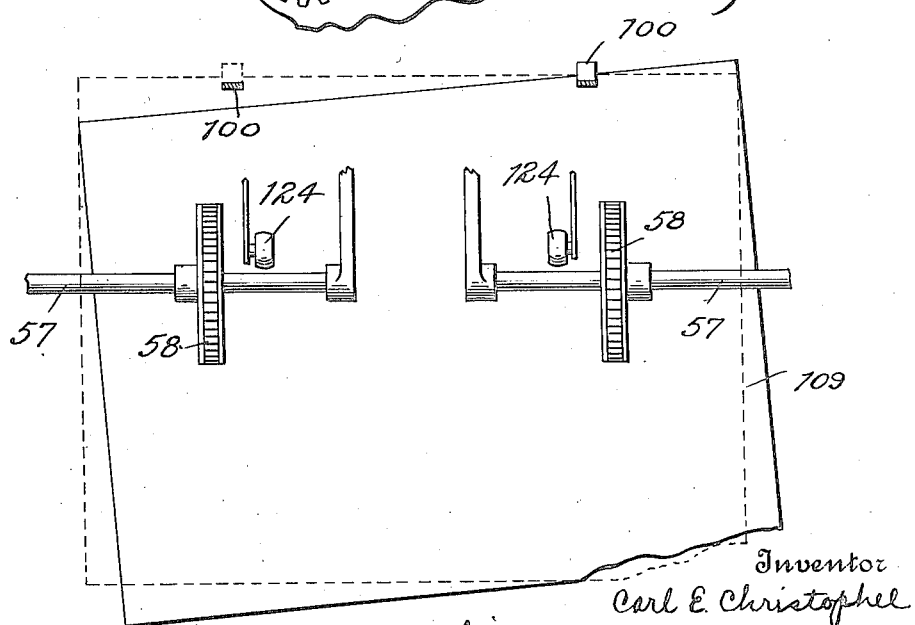
Fig. 11 is a diagrammatic plan view of the combing elements in their relations to each other for straightening a sheet.

Referring first to Figs. 2 and 3, the bed plate 1 provided with bosses 2 serves to mount a plurality of vertical supports 3, some of which constitute laterally spaced guides for the carriages or slides 4, each of which is provided with rollers 5 mounted on shafts 6. Said rollers are preferably corrugated or toothed to adapt them to engage the under surface of a pile-holding table 7, which if desired, may be provided with suitable wearing gear strips for coöperating with the rollers 5. Each of the carriages or slides 4 is provided with an outwardly projecting pin 8 to which is attached one end of a counterweight chain 9 which passes over a chain pulley 10 (see Fig. 13) which is slidable longitudinally of a shaft 11 and provided with sockets 12 in its lateral face to adapt it to be releasably clutched to a spiral gear 13 by means of pins 14 carried by said spiral gear and fitted into the sockets 12. Secured to the other end of each of said chains 9 is a counterweight 14, the two counterweights serving to approximately counterweight the pile-holding table with its average load. These counterweights can, of course, be changed at will to suit conditions. The rear ends of the shaft 6 are squared to receive a crank by means of which the rollers 5 may be turned for laterally adjusting the position of the feed board 7. From an inspection of Fig. 3, it will be apparent that the feed board 7 with its load may be mounted on a truck and brought in a position in which it overhangs the rollers 5 in their lowered positions, after which the carriages 4 may be elevated to lift the table 7 from the truck, together with its load in condition to be fed through the machine. Extending transversely of the machine is a shaft 15 to which is keyed at one end a worm 16 which meshes with the spiral gear 13. As shown best in Fig. 12, the other end of the shaft 15 carries a sleeve 17 which turns freely on the shaft 15 and has keyed thereto a worm 18 which meshes with the right hand spiral 19. The spiral gear 19 is keyed to a stub shaft 20, said shafts 11 and 20 being journaled in suitable brackets 21. In order to provide means for operating the pile by hand, the sleeve 17 is provided in its outer end with recesses 22, with which are adapted to engage oppositely arranged fingers or lugs 23 which project laterally from a crank arm 24 provided with a handle 25, said crank arm being slidable endwise along the shaft 15. The shaft 15 carries a pin 26 which is adapted to extend radially between the fingers or lugs 23. It will be seen from this description that the crank arm 24 may be moved sufficiently to the left to engage only the pin 26, thus adapting the crank arm 24 to rotate only the worm 16 at the left side of the machine. Or said crank arm may be further displaced to have said lugs or fingers 23 engaged in the recesses 22 so that said crank arm is thereby adapted to rotate both the worms 16 and 18. In this manner, the table may be raised or lowered as a whole or the left side of said table may be raised or lowered relatively to the right side thereof for changing the inclination of the same. As indicated by dotted lines in Fig. 13, the chain gear 10 may be moved to the right so as to release the table or its gearing connections so as to enable said table to be raised and lowered by merely sliding the same along its guides 3, thus adapting it for rapid adjustment. In order to provide suitable and efficient automatic means for maintaining the pile-holding table at the proper elevation, as well as the correct angle, to effect a maximum feeding efficiency, the following connections are provided: Keyed to the left end of shaft 15 is a ratchet 27 with which meshes a pawl 28 carried by an oscillatory lever 29 which is journaled upon a contracted lateral projection of the bearing 30 of the shaft 15, similar to that to be presently described for the driving connections at the right end of the shaft 15. The bearing boss 31 for the right end of said shaft is provided with the contracted laterally projecting portion 32 upon which is journaled the hub 33 of an oscillatory lever 34 which pivotally mounts a pawl 35 which meshes with a ratchet 36 which is keyed to the sleeve 17 for driving the worm 18. As shown best in Fig. 2, the lower arm of the lever 34 has connected thereto at 37, the rear end of a connecting rod 38, the forward end of said rod being pivotally connected at 39 with a cam arm 40 which carries a cam roller 41 running on a cam 42 keyed to a cam shaft 43. A spring rod 44 is connected to the cam lever 40 and carries a collar 45, between which and a fixed abutment 46, is disposed a compression spring 47 which serves to hold the roller 41 in running contact with the cam 42. It will therefore be seen that the cam 42 periodically operates the rod 38 and is adapted, unless prevented by suitable mechanism, to be hereinafter described, to impart a feed of one tooth to the ratchet 36. This mechanism is duplicated on the opposite side of the machine so that this description will serve for both. The connecting rod 38 is notched intermediately of its ends to provide a shoulder 48, adapted to be engaged by a pawl 49 keyed to a stop shaft 50. As shown best in Figs. 6, 7 and 8, the stop shaft 50 is journaled in the side frame 51 and has keyed thereto, a cam lever arm 52 which is curved rearwardly and provided with a deflected extremity 53 which is adapted to be displaced by engagement with a cam roller 54 journaled on a pin 55 (see Fig. 5) which projects laterally from each of the outer lever arms 56 in which is journaled the shaft 57 which carries the combing wheel 58 on each side of the machine. As shown in Fig. 2, power is delivered to the machine by means of a belt 59 which may be propelled by an electric motor or other suitable means. This belt drives a pulley 60 keyed to the transverse shaft 61 which carries the paper feeding rolls 62. According to Fig. 10, the drive shaft 61 on the end opposite to a pulley 60, carries a gear 63 which meshes with a gear 64 journaled on a stud 65, said gear 64 in turn meshing with a gear 66 journaled on a stud 67. The gear 67 meshes with a large gear 68 keyed to the cam shaft 43, thus providing power for driving the cam 42 and the reciprocatory bar 38. The gear 68 meshes with a gear 69 which is keyed to a shaft 70 which also carries a larger gear 71 which meshes with a gear 72 keyed to a shaft 73. Also keyed to the shaft 73 on either side of the machine, is a sprocket wheel 74 which drives a chain 75 which runs about another sprocket 76 keyed to the combing wheel spindle 57. The combing wheels 57 on both sides of the machine are therefore continuously rotated during the operation of the machine. The combing wheel lever arms 56 of each combing wheel are keyed to a sleeve 77 which is journaled upon the transverse shaft 73, said sleeve also carrying the cam arm 78 provided with a cam roller 79 journaled thereon, which is adapted to be moved by a cam 80 which is freely journaled upon the shaft 43. On the laterally projecting pin 81 which is carried by the cam 80, is journaled a guide roller or pulley 82. The cam 80 is also provided with a second pulley or a guide roller 83 which is journaled on the cam shaft 43, said guide rollers 82 and 83 serving to guide a chain or a cable 84 in reverse bends around the cam 80. The upper end of the chain 84 is connected to a stud 85 carried by an arm 86 keyed to a rock shaft 87. As shown in Fig. 2, the rock shaft 87 also has keyed thereto an arm 88 which is pivotally connected at 89 to one end of a connecting rod 90, the other end of said connecting rod being pivoted on a stud 91 which projects laterally from the cam 42. This mechanism is adapted to impart an endwise movement of the chain or cable around the pulleys 82 and 83. Another pulley 92 is journaled on a tie rod 93, the lower end of the chain or cable 84 being passed about said pulley 92 and secured at 94 to the forward end of a ratchet bar 95, there being one of these ratchet bars for each of the combing wheels. Coöperating with the ratchet bar 95 on either side of the machine, is a dog or pawl 96 which is oscillatable about the axis of a spindle 97 which is journaled in laterally spaced radial arms 98 which are keyed to a shaft 99. The spindle 97 carries a sheet-actuated pendulum 100 which is normally disposed in the path of a sheet which is being fed from the top of the pile by the combing wheel 58. Keyed to the shaft 99 on either side of the machine, is a cam lever arm 101 which is operated by a periodic cam 102 on the cam shaft 43 for throwing the pendulum 100 upwardly to give full clearance to the sheet which is passing under the pendulums 100. A stop 103 is carried by one of the radial arms 98 for limiting the upward movement of the pawl or dog 96. The cams 80, each of which operates a cam roller 79, are each provided with a rearwardly projecting cam arm 104 which is suitably spaced from the inner run of the cam 80 and serves as a positive action cam which operates on the cam roller 79 to force combing wheel 58 to its work and hold it there when in the lowered position. The cam arm 104 is provided with a bend 105 which is adapted to form a resting place for the cam roller 79 on its return movement so that when the periodic cam 106 has released cam roller 108, the return movement of cam 80 adapts the arm 104 to force the combing wheel to its work. By this means, a very high speed is obtainable. The periodic cam 106 which is keyed to the cam shaft 43, is adapted at regularly recurring turns to elevate the combing wheel 58, and to hold it elevated for a period of time which will permit the top sheet of the pile to be drawn from the feeder. For this purpose, as shown in Fig. 5, the cam arm 78 is provided with an elongated boss 107 which carries the cam roller 79 on one end and a second cam roller 108 on the other end which coöperates with the periodic cam 106. A top sheet having been fed from the pile 109 carried by the table 7, is delivered between the lower feed rollers 62 and the drop rollers 110 which are mounted on a spindle 111 which is journaled in the spaced lever arms 112 keyed to a rock shaft 113 provided with a cam arm 114 which carries a cam roller 115 running on the drop roller cam 116 which is keyed to the cam shaft 43. Mounted on a tie rod 93 are a plurality of brackets 118 which support the rearwardly extending guards 119. In order to adapt the present machine to straighten a sheet which is fed by the feeding machine, a bracket or support 120 is mounted on one of the rods 119 on either side of the machine, each of said supports carrying a laterally projecting pin 121 upon which is journaled the hub 122 of a rearwardly presented lever arm 123 which has a roller 124 journaled on its rear end (see Fig. 4). The roller 124 is yieldably pressed to the top sheet of the pile by means of a spring 125 which is mounted on the pin 121 and has one end engaging a lug 126 carried by the arm 123 and the other end engaging a lug carried by an abutment 127. Referring now to Fig. 11, the preferred embodiment of this device is shown diagrammatically in plan. In this figure of the drawings, the combing wheels 58 which act upon the sheet 109 are respectively disposed adjacent the rollers 124. In the event, therefore, that the combing wheel 58 on one side has brought its side of the sheet against the pendulum 100 prior to the opposite front edge of the sheet, the combing wheel 58 on the right having been raised, the combing wheel on the left continuing in operation, will move the sheet 109 about the right hand roller 124 as a pivot and will thus straighten the sheet. As shown in Fig. 8, the lever arm 101 is provided with a stop pin 129 which limits the movement of the lever arm 101 by being confined between stop pins 130. Referring now to Figs. 9, 16, 17 and 18, projecting upwardly and forwardly from the rod 93 is a bracket arm 131. A tension spring 132 has its forward end secured to a pin 133 carried by the arm 131, the rear end of said spring being connected to the lower end of a cam arm 134 which is journaled on a stud 135. The cam arm 134 carries a cam roller 136 which runs on a cam 137 on the cam shaft 43. The spring 132 holds the cam roller 136 in running contact with the cam 137. A connecting rod 138 has its forward end journaled on a stud 139 carried by the lower end of cam arm 134, the rear end of said connecting rod 138 being journaled on a stud 140 carried by the lower arm 141 of a lever journaled on a stud 142 which projects laterally from a central bracket or support 143. The upper arm 144 of this lever carries a stud 145 to which one end of a cam bar 146 is pivotally connected. As shown in Fig. 2, the other end of the cam bar 146 is pivotally connected at 147 with an oscillatory arm 148 journaled on a stud 149 carried by a depending bracket 150 which is supported at the rear end of a bar 151, said bar being secured by screws 152 to the central bracket or support 143. As shown in Fig. 17, the bracket 151 is preferably made of channel cross section, a block or slide 153 being reciprocably mounted thereon and provided with a strap or band 154 for retaining it in position. A set screw 155 serves to secure the block or slide to the bar 151 in any desired position. The block or slide 153 carries vertically spaced guides 156 and 157 which serve to reciprocably mount a plunger 158 which carries at its upper end a weight 159 secured to the plunger 158 by means of a set screw 160. The plunger 159 is provided along one edge with ratchet teeth 161 adapted to cooperate with a pawl 162 which oscillates about a stud 163 carried by a curved arm 164 which is journaled on a screw 165. The other end of the curved arm 164 carries a cam roller 166 which is raised and lowered by the cam bar 146. Depending from the block or slide 153 is a bracket arm 167 to which is secured one end of a spring 168. The other end of said spring being secured to a laterally projecting pin 169 carried by the cam roller arm 164. The plunger 158 carries a pressure foot 170 which is adapted to clamp the pile while the top sheet is being withdrawn from the pile. The front edge of the pile of sheets 109 is held in alinement by vertical guide rods 171, held in position above by brackets 172 and secured below to the transverse rod 173. A spring 174 which is connected at one end to a stud 175 carried by the cam arm 52 and which is secured at its other end to a pin 176, serves to retain the cam arm 52 in engagement with the cam roller 54 carried by the arm 56 which carries the combing wheel 58. By an inspection of Fig. 6, it will be apparent that the combing wheel 58 in lowered position acts upon portions of the sheets 109 which overlap a fixed feed table 177, exerting pressure on the rear edge of said table which is normal to the surface of said table. Said feed table is carried by brackets 178 supported by rods 179 and 180. A spring 181 connected at one end to a forwardly projecting bracket arm 182 carried by the rod 93 and at its other end connected to the cam 80, imparts a tendency to hold said cam 80 in a position shown in Fig. 6. Referring now to Fig. 8, suitable and efficient means for rendering the machine inoperative without shutting off the power, is provided as follows: A rock shaft 179 has keyed thereto a handle 184 which carries a forwardly projecting stop 185 which is limited in its movement by spaced stops 186. Keyed to the rock shaft 179 is an arm 187 enlarged at its upper end to adapt it to intercept the downward movement of the combing wheel shaft 57. The rock shaft 179 is held against either stop 186 by a spring 183. When the machine is to be thrown into operation, the arm 187 is thrown into full line position shown in Fig. 8. The operation of my improved pile combing feeder will now be readily understood and briefly described is as follows:

As has already been pointed out, the laterally spaced carriages 4 may be lowered by releasing the chain pulleys 10 from the spiral gears 13, thus making it possible to lower the pile-receiving table 7 by merely pressing upon it with the hand. This operation, of course, may be formed by having the crank 24 engaging both the shaft 15, as well as the sleeve 17 and simultaneously lowering both sides by gear. When the carriages 4 have been sufficiently lowered, the table 7 mounted on a truck and carrying a pile of sheets may be moved into position to overhang the rollers 5, after which the machine may be started. Under these conditions, let it be supposed that the top of the pile is not sufficiently high to be engaged by the combing wheels 58 when they are periodically lowered under the control of periodic cams 106. Obviously, the sheet control cams 80 will remain inoperative and hence as each of the combing wheels 58 is raised periodically by the cam 106, the bar 38 will be permitted to move toward the left, according to Fig. 6, before the combing wheel 58 rises and permits the pawl 49 to drop. It will thus be seen that the table 7 will be automatically elevated in the manner hereinbefore described until such time as the combing wheels 58 engage the pile efficiently enough to bring the top sheet of said pile into engagement with the pendulum 100 prior to the forward movement of the notched bar 38. Under these conditions the combing wheels 58 on one or both sides will be raised soon enough to permit the pawl or dog 52 to drop into the path of the shoulder 48 which thus prevents a table-elevating movement for that sheet. In Fig. 6 is shown the positions of the parts after the combing wheel 58 has dropped to the pile. The pressure of the combing wheel will be seen to be distributed between the pile proper and that portion of the pile which has been combed out over the fixed table 177. This distribution of pressure corresponds to the maximum feeding efficiency so that when the pile becomes lowered, a relatively great portion of the pressure falls upon the portions of the sheets which overlie the fixed board 177. Under this condition, the period of feed is lengthened so that eventually the sheet-actuated pendulum 100 is raised only after the notched bar 38 has moved toward the left. In consequence, an upward movement of the table 7 is occasioned on that side. In Fig. 7 is shown the positions of the parts just after the pawl 49 has been permitted to intercept the shoulder 48 by the combing wheel 58 having been raised by a relatively short period of comb. This elevating movement of the combing wheel 58 has been brought about by the pawl or dog 96 dropping into engagement with the rack 95 and by thus interrupting the endwise movement of the chain or cable 84, the rock shaft 87 straightens out the chain 84 and thus imparts a clockwise movement to the cam 80 which moves it into the position shown in Fig. 7. As shown in Fig. 8, the rock shaft 87 has again moved to the left, the sheet having passed out permits the pendulum 100 to fall while the combing wheel 58 is just about to be permitted to fall by the periodic cam 106. The bend 105 in the cam arm 104 serves to hold the cam 80 from a full return movement at this time, and until such time as the cam roller 79 is fully released by the periodic cam 106. At each upward movement of the cam bar 146 (see Figs. 16, 17 and 18) the arm 164 is moved upwardly by cam roller 166 so that the pawl or dog 162 which has been held out of engagement with the rack 161 by means of a pin 188 carried by the block or slide 153, is permitted to move into engagement with the rack 161 for raising the plunger 158, thus releasing the top sheets of the pile to the combing action. On the downward movement of the cam bar 146, the pawl or dog 162 being drawn against the pin 188, serves to release the rack 161 so that the plunger 158 drops until the pressure foot 170 rests firmly against the pile. In this manner, the tail drag is automatically adapted to exert its full pressure on the pile after each top sheet is retracted.

I claim:

1. In a machine of the character described, sheet-feeding means, a table for holding a pile of sheets to be fed by said sheet-feeding means, and means controlled by the period of activity of said sheet-feeding means for changing the elevation of one end of said table relatively to the other.

2. In a machine of the character described, sheet-feeding means, means for independently feeding opposite sides of a pack or pile of sheets, and means controlled by the period of activity of said sheet-feeding means for feeding one side of said pack or pile independently of the other side of said pack or pile.

3. In a machine of the character described, sheet-feeding means, table guides, a table slidably mounted on said guides for holding a pile of sheets to be fed by said feeding means, means for moving opposite ends of said table independently of each other, and means under the control of said sheet-feeding means for separately operating said moving means, said controlling means including means actuated respectively by laterally spaced portions of the forward edge of the sheet.

4. In a sheet-feeding machine, sheet-feeding means, means for supporting a pile of sheets to be fed off successively by said sheet-feeding means, and means controlled by the period of activity of said sheet-feeding means for angularly adjusting said pile-supporting means with respect to the plane of feed of said sheet-feeding means.

5. In a sheet-feeding machine, the combination with sheet-feeding means, a crank shaft extending transversely of said machine, a sleeve journaled on said crank shaft, a worm keyed to said shaft, another worm keyed to said sleeve, gears meshing respectively with said worms, a table for carrying a pile of sheets to be fed off by said sheet-feeding means, means operated by said gears for raising and lowering said table, and means for rotating said shaft and sleeve independently of each other, said rotating means including ratchets keyed respectively to said shaft and sleeve, pawls for driving said ratchets, and means under the control of said sheet-feeding means for operating said pawls.

6. In a sheet-feeding machine, the combination with sheet-feeding means, a crank shaft extending transversely of said machine, a sleeve journaled on said crank shaft, a worm keyed to said shaft, another worm keyed to said sleeve, gears meshing respectively with said worms, a table for carrying a pile of sheets to be fed off by said sheet-feeding means, means operated by said gears for raising and lowering said table, and means for rotating said shaft and sleeve independently of each other, said raising and lowering means including pulleys releasably clutched to said gears respectively, and chains or cables passing over said pulleys and connected to said table.

7. In a sheet-feeding machine, the combination with sheet-feeding means, a crank shaft extending transversely of said machine, a sleeve journaled on said crank shaft, a worm keyed to said shaft, another worm keyed to said sleeve, gears meshing respectively with said worms, a table for carrying a pile of sheets to be fed off by said sheet-feeding means, means operated by said gears for raising and lowering said table, and means for rotating said shaft and sleeve independently of each other, said crank shaft having a crank movable longitudinally thereof and adapted to rotate said shaft separately.

8. In a sheet-feeding machine, the combination with sheet-feeding means, a crank shaft extending transversely of said machine, a sleeve journaled on said crank shaft, a worm keyed to said shaft, another worm keyed to said sleeve, gears meshing respectively with said worms, a table for carrying a pile of sheets to be fed off by said sheet-feeding means, means operated by said gears for raising and lowering said table, and means for rotating said shaft and sleeve independently of each other, said crank shaft being provided with a crank movable axially on the shaft into operating engagement with said sleeve and shaft.

9. In a machine of the character described, means for feeding each side of a pile or pack of sheets independently of the opposite side of said pile or pack of sheets, sheet-feeding means operating respectively on opposite sides of said pile or pack of sheets, and means depending on the respective periods of activity of said sheet-feeding means for controlling the operations of said pile or pack feeding means independently of each other.

10. In a machine of the character described, a combing wheel oscillatable about an axis away from its rotary axis, a freely journaled cam for lifting said combing wheel from a pile of sheets, a guide pulley journaled on said cam, flexible means movable endwise around said pulley without displacing said cam, means for imparting an endwise movement to said flexible member, and sheet controlled means for interrupting the movement of said flexible member on one side only of said guide pulley, the continued movement of said flexible member on the other side of said guide pulley being adapted to move said cam.

11. In a sheet-feeding machine, automatically controlled sheet-combing devices, a table for carrying sheets to be fed by said devices, and means controlled by the interval of comb of one of said devices for changing the elevation of one side of said table relatively to the other.

12. In a sheet-feeding machine, automatically controlled sheet-combing devices, a table for carrying sheets to be fed by said devices, and means controlled by the interval of comb of one of said devices for changing the elevation of one side of said table relatively to the other, said means being adapted to raise one side under a relatively long combing period of the combing device corresponding to that side.

13. In a sheet-feeding machine, laterally spaced automatically controlled sheet-combing devices, a table for carrying a pile of sheets to be fed off by said devices, and means controlled by the interval of comb of each of said devices for changing the relative elevations of the sides of said table corresponding respectively to said devices.

14. In a sheet-feeding machine, laterally spaced automatically controlled sheet-combing devices, a table for carrying a pile of sheets to be fed off by said devices, and means controlled by the interval of comb of each of said devices for changing the relative elevations of the sides of said table corresponding respectively to said devices, each of said devices under a relative long period of comb being adapted to elevate the side of said table corresponding thereto, relatively to the other side.

15. In a sheet-feeding machine, laterally spaced automatically controlled sheet-combing devices, a table for carrying a pile of sheets to be fed off by said devices, and means controlled by the interval of comb of each of said devices for changing the relative elevations of the sides of said table corresponding respectively to said devices, each of said sheet-combing devices being provided with sheet-actuated means for determining the duration of the period of activity of the sheet-combing device.

16. In a sheet-feeding machine, laterally spaced automatically controlled sheet-combing devices, a table for carrying a pile of sheets to be fed off by said devices, and means controlled by the interval of comb of each of said devices for changing the relative elevations of the sides of said table corresponding respectively to said devices, each of said devices under a relative long period of comb being adapted to elevate the side of said table corresponding thereto, relatively to the other side, each of said sheet-combing devices being provided with sheet-actuated means for determining the duration of the period of activity of the sheet-combing device.

17. In a machine of the character described, sheet-combing means movable into and out of sheet-combing position, a table for a pile of sheets to be combed thereby, table-raising means including a reciprocatory bar and a pawl or dog for engaging said bar, said pawl or dog being moved by the movements of said sheet-combing means.

18. In a machine of the character described, sheet-combing means movable into and out of sheet-combing position, a table for a pile of sheets to be combed thereby, table-raising means including a reciprocatory bar and a pawl or dog for engaging said bar, said pawl or dog being moved by the movements of said sheet-combing means, said bar being driven by a cam and provided with a notch to be engaged by said pawl or dog.

19. In a machine of the character described, an automatically controlled sheet-combing device, a table for carrying a pile of sheets to be fed off by said device, means for elevating said table, sheet-actuated means for determining the duration of the period of activity of said sheet-combing device, a bar for transmitting power to said table-elevating means, and means operated by said combing device for controlling the movements of said bar, the last mentioned means comprising a pawl oscillatably mounted to move into and out of engagement with said bar and a lever arm connected to said pawl and suitably disposed to be displaced by the sheet-combing device.

20. In a paper-feeding machine, laterally spaced automatically controlled sheet-combing devices, a table for holding a pile of sheets to be fed by said devices and normally inoperative means controlled by the interval of comb of each of said sheet-combing devices, for changing the elevation of each side of the table independently of the other.

21. In a machine of the character described, laterally spaced periodically active sheet-combing means, a pile-holding table, means for independently raising opposite sides of said table, and means respectively operated by said sheet-combing means, under normal periods of activity for preventing the operation of said table-raising means.

22. In a machine of the character described, laterally spaced periodically active sheet-combing means, a pile-holding table, means for independently raising opposite sides of said table, and means respectively operated by said sheet-combing means under normal periods of activity for preventing the operation of said table-raising means, the preventing means for each of said table-raising means being rendered inoperative by an abnormally prolonged period of activity of the sheet-combing means corresponding thereto.

23. In a machine of the character described, laterally spaced periodically active sheet-combing means, a pile-holding table, means for independently raising opposite sides of said table, and means respectively operated by said sheet-combing means under normal periods of activity for preventing the operation of said table-raising means, the preventing means for each of said table-raising means being rendered inoperative by an abnormally prolonged period of activity of the sheet-combing means corresponding thereto, said laterally spaced sheet-combing means being capable of different periods of activity.

24. In a machine of the character described, sheet-combing means movable into and out of sheet-combing position, a table for holding a pile of sheets to be fed by said sheet-combing means, periodically operable means for elevating said table, periodically operated means for moving said sheet-combing means out of sheet-combing position after the operation of said table-elevating means, sheet-controlled means for moving said sheet-combing means out of sheet-combing position when the top sheet of said pile has reached a predetermined position, and means operated by the movement of said sheet-combing means out of sheet-combing position for preventing the operation of said table-elevating means when the sheet-combing operation is terminated prior to the operation of said table-elevating means.

25. In a machine of the character described, sheet-feeding means for each side of the machine adapted to be in active operation on the top sheet of a pile for a predetermined period of time, sheet-actuated means for each side of the machine for terminating the operation of said sheet-feeding means before the expiration of such predetermined period, a table for holding a pile of sheets, means for elevating each side of said table independently of the other, and means operated by the sheet-actuated means under a normal period of activity of the sheet-feeding means for rendering the table-elevating means inoperative.

26. In a machine of the character described, the combination with laterally spaced sheet-combing wheels adapted to periodically operate upon the top sheet of a pile, laterally spaced sheet-actuated pendulums for terminating the periods of activity of said combing wheels respectively, and means for elevating each side of said pile of sheets independently of the other side of said pile during an abnormally extended period of activity of the corresponding sheet-combing wheel.

27. In a machine of the character described, the combination with laterally spaced sheet-combing wheels adapted to periodically operate upon the top sheet of a pile, laterally spaced sheet-actuated pendulums for terminating the periods of activity of said combing wheels respectively, and means for elevating each side of said pile of sheets independently of the other side of said pile during an abnormally extended period of activity of the corresponding sheet-combing wheel, each side-elevating means being rendered inoperative during a normal period of activity of the sheet-combing wheel.

28. In a machine of the character described, laterally spaced combing wheels adapted to operate on the top of a pile of sheets, means for separately elevating opposite sides of said pile of sheets, sheet-actuated means for each of said combing wheels, means under the control of each sheet actuated means for raising the corresponding combing wheel, and means operated by the upward movement of each combing wheel for rendering said pile raising means for that side inoperative.

29. In a machine of the character described, a fixed feed table, means for holding a pile of sheets in suitable position to have sheets fed from the top of said pile over said feed table, a rotary pile comber exerting pressure partly on the pile and partly on portions of the sheets supported on said feed table, and means for elevating said pile of sheets, said elevating means depending upon the relative pressures upon the portions of sheets over feed table and pile respectively.

30. In a machine of the character described, a feed board or table, a table for supporting a pile of sheets, a pile-combing wheel for feeding sheets from the top of said pile over said feed board or table, the pressure of said combing wheel being divided between the pile and portions of the pile displaced over said feed board or table, sheet-actuated means disposed in the path of sheets fed by said combing wheel, and means controlled by the period of comb of said combing wheel for raising said combing wheel.

31. In a machine of the character described, a fixed feed plate or board, a pile-carrying table movable vertically with respect to said feed plate or board, periodically operated means for elevating said table, a combing wheel adapted to move into position to comb the top sheets of said pile over said feed plate or table, sheet-actuated means for raising said combing wheel, means depending on the period of comb for interrupting said table-elevating means, said interrupting means being held inoperative during the combing period and released by the upward movement of said combing wheel.

32. In a machine of the character described, a sheet-feeding instrumentality adapted to move into and out of engagement with a pile of sheets, an oscillatory member for raising said sheet-feeding instrumentality, a pulley or guide carried by said oscillatory member, a chain or cable passing around said pulley or guide, means for moving said chain or cable endwise, and sheet-actuated means for interrupting the movement of said chain or cable at one end, said oscillatory member being oscillated by the consequent straightening of said chain or cable.

33. In a machine of the character described, a combing wheel movable about an axis into and out of position to act upon a pile of sheets to be fed, a freely journaled cam for raising said combing wheel, a pulley freely journaled on said cam on an axis eccentric to the journaling axis of said cam, a flexible member passing about said pulley, yieldable means for holding said cam in position corresponding to the combing wheel in combing position, and means controlled by a sheet for straightening said flexible member to displace said cam into position to lift the combing wheel.

34. In a machine of the character described, a combing wheel movable about an axis into and out of position to act upon a pile of sheets to be fed, a freely journaled cam for raising said combing wheel, a pulley freely journaled on said cam on an axis eccentric to the journaling axis of said cam, a flexible member passing about said pulley, yieldable means for holding said cam in position corresponding to the combing wheel in combing position, means controlled by a sheet for straightening said flexible member to displace said cam into position to lift the combing wheel, and means under the control of said combing wheel for elevating said pile.

35. In a machine of the character described, a combing wheel movable about an axis into and out of position to act upon a pile of sheets to be fed, a freely journaled cam for raising said combing wheel, a pulley freely journaled on said cam on an axis eccentric to the journaling axis of said cam, a flexible member passing about said pulley, yieldable means for holding said cam in position corresponding to the combing wheel in combing position, and means controlled by a sheet for straightening said flexible member to displace said cam into position to lift the combing wheel, said sheet-controlled means including a pendulum disposed in the path of a sheet and adapted to be displaced by said sheet.

36. In a machine of the character described, a combing wheel movable about an axis into and out of position to act upon a pile of sheets to be fed, a freely journaled cam for raising said combing wheel, a pulley freely journaled on said cam on an axis eccentric to the journaling axis of said cam, a flexible member passing about said pulley, yieldable means for holding said cam in position corresponding to the combing wheel in combing position, and means controlled by a sheet for straightening said flexible member to displace said cam into position to lift the combing wheel, said sheet-controlled means being provided with means for moving it away from the sheet.

37. In a machine of the character described, a combing wheel movable about an axis into and out of position to act upon a pile of sheets to be fed, a freely journaled cam for raising said combing wheel, a pulley freely journaled on said cam on an axis eccentric to the journaling axis of said cam, a flexible member passing about said pulley, yieldable means for holding said cam in position corresponding to the combing wheel in combing position, and means controlled by a sheet for straightening said flexible member to displace said cam into position to lift the combing wheel, said sheet-controlled means including a pendulum disposed in the path of a sheet and adapted to be displaced by said sheet, and periodically operated means for elevating said pendulum away from said sheet.

38. In a machine of the character described, a combing wheel oscillatable about an axis away from its rotary axis, a freely journaled cam for lifting said combing wheel from a pile of sheets, means yieldably retaining said cam in position corresponding to the pile-combing position of said combing wheel, sheet-controlled means for moving said cam on its axis to raise said combing wheel, means for elevating said pile, and means operated by the lifting movement of said combing wheel for blocking the movement of said pile-elevating means.

39. In a machine of the character described, a combing wheel oscillatable about an axis away from its rotary axis, a freely journaled cam for lifting said combing wheel from a pile of sheets, means yieldably retaining said cam in position corresponding to the pile-combing position of said combing wheel, sheet-controlled means for moving said cam on its axis to raise said combing wheel, means for elevating said pile, and means operated by the lifting movement of said combing wheel for blocking the movement of said pile-elevating means, said blocking means depending for its effectiveness upon the operation of said combing wheel raising means prior to the operation of said pile-raising means.

40. In a machine of the character described, a combing wheel oscillatable about an axis away from its rotary axis, a freely journaled cam for lifting said combing wheel from a pile of sheets, means yieldably retaining said cam in position corresponding to the pile-combing position of said combing wheel, and sheet-controlled means for moving said cam on its axis to raise said combing wheel, said sheet-controlled means comprising a pulley freely journaled upon said cam, a flexible member guided by said pulley, and means for drawing said flexible member around said guide pulley.

41. In a machine of the character described, a combing wheel oscillatable about an axis away from its rotary axis, a freely journaled cam for lifting said combing wheel from a pile of sheets, means yieldably retaining said cam in position corresponding to the pile-combing position of said combing wheel, and sheet-controlled means for moving said cam on its axis to raise said combing wheel, said sheet-controlled means comprising a flexible member which normally passes freely about a part carried by said cam at a distance from its axis, and means for arresting said flexible member on one side of said cam.

42. In a machine of the character described, a combing wheel oscillatable about an axis away from its rotary axis, a freely journaled cam for lifting said combing wheel from a pile of sheets, means yieldably retaining said cam in position corresponding to the pile-combing position of said combing wheel, and sheet-controlled means for moving said cam on its axis to raise said combing wheel, said sheet-controlled means comprising a pulley freely journaled on said cam on an axis distant from the axis of said cam, a chain bending in one direction about the hub of said cam and in an inverse direction about said pulley, means for moving said chain endwise, and a sheet-actuated pendulum adapted to arrest the movement of one end of said chain.

43. In a machine of the character described, a combing wheel oscillatable about an axis away from its rotary axis, a freely journaled cam for lifting said combing wheel from a pile of sheets, means yieldably retaining said cam in position corresponding to the pile-combing position of said combing wheel, and sheet-controlled means for moving said cam on its axis to raise said combing wheel, said sheet-controlled means comprising a pulley freely journaled on said cam on an axis distant from the axis of said cam, a chain bending in one direction about the hub of said cam and in an inverse direction about said pulley, means for moving said chain endwise, and a sheet-actuated pendulum adapted to arrest the movement of one end of said chain, said chain having a reciprocatory ratchet connected thereto and coöperating with a pawl operated by said pendulum.

44. In a machine of the character described, a power driven shaft, a combing wheel rotated thereby and oscillatable about the axis thereof, a cam shaft, a cam freely journaled thereon for operating said combing wheel, a guide pulley journaled on the cam away from the axis thereof, a rock shaft, a ratchet movable to and fro, a chain connected to said ratchet and rock shaft and passing about said guide pulley, and sheet-actuated means including a pawl for interrupting the movement of said ratchet.

45. In a machine of the character described, a power driven shaft, a combing wheel rotated thereby and oscillatable about the axis thereof, a cam shaft, a cam freely journaled thereon for operating said combing wheel, a guide pulley journaled on the cam away from the axis thereof, a rock shaft, a ratchet movable to and fro, a chain connected to said ratchet and rock shaft and passing about said guide pulley, a sheet-actuated means including a pawl for interrupting the movement of said ratchet, a cam arm for elevating said sheet-actuated means, and a cam on said cam shaft for operating said cam arm.

46. In a machine of the character described, a combing wheel movable into and out of combing engagement with a pile of sheets, an oscillatable cam for operating said combing wheel, a periodic cam for operating said combing wheel, sheet-controlled means for operating said oscillatable cam to raise said combing wheel, and means for holding said oscillatory cam against return movement during the period of activity of the periodic cam.

47. In a machine of the character described, a combing wheel movable into and out of combing engagement with a pile of sheets, an oscillatable cam for operating said combing wheel, a periodic cam for operating said combing wheel, sheet-controlled means for operating said oscillatable cam to raise said combing wheel, and means for holding said oscillatory cam against return movement during the period of activity of the periodic cam, said combing wheel being provided wth a cam arm common to both of said cams.

48. In a machine of the character described, a combing wheel movable into and out of position to comb the top of a pile of sheets, a cam arm for oscillating said combing wheel, a periodic cam for operating said cam arm, a freely journaled cam suitably disposed to operate said cam arm, and sheet-controlled means for operating said oscillatory cam, said oscillatory cam being provided with a projecting portion which interlocks with said cam arm to prevent a premature return of the oscillatory cam when said combing wheel is held in elevated position by said periodic cam.

49. In a machine of the character described, a cam shaft, a periodic cam keyed to said cam shaft, an oscillatable cam freely journaled on said cam shaft, a combing wheel adapted to be operated by said cams, a chain guide mounted on said oscillatory cam, a rock shaft, a chain connected to said rock shaft and passing over said chain guide, a rack bar connected to said chain, a sheet-actuated pendulum, and a pawl operated by said pendulum for intercepting said rack, the movement of said rock shaft being adapted to oscillate the freely journaled cam when said rack is intercepted by said pawl.

50. In a machine of the character described, a cam shaft, a periodic cam keyed to said cam shaft an oscillatable cam freely journaled on said cam shaft, a combing wheel adapted to be operated by said cams, a chain guide mounted on said oscillatory cam, a rock shaft, a chain connected to said rock shaft and passing over said chain guide, a rack bar connected to said chain, a sheet-actuated pendulum, and a pawl operated by said pendulum for intercepting said rack, the movement of said rock shaft being adapted to oscillate the freely journaled cam when said rack is intercepted by said pawl, said oscillatory cam being held against a premature return movement by said periodic cam.

51. In a machine of the character described, a combing wheel movable into and out of position to comb the top of a pile of sheets, an oscillatory cam for raising said combing wheel, said cam being provided with guides forming an indirect line across said cam, a flexible member passing around said guides, means acting on said flexible member on one side of said cam to impart an endwise movement thereto over said guides, and sheet-actuated means for intercepting the movement of said flexible member on the other side of said cam, said means for imparting movement to the flexible member being adapted to oscillate said oscillatable cam by shortening the path around said guides.

52. In a feeding machine, a tail drag comprising a plunger, means releasably engaging said plunger, and means for releasing said plunger engaging means to permit said plunger to drop freely to a pile of sheets.

53. In a feeding machine, a tail drag comprising a plunger, means releasably engaging said plunger, and means for releasing said plunger engaging means to permit said plunger to drop freely to a pile of sheets, said plunger-engaging means being movable upward and actuated by such upward movement to engage said plunger.

54. In a feeding machine, a tail drag comprising a plunger, means releasably engaging said plunger, and means for releasing said plunger engaging means to permit said plunger to drop freely to a pile of sheets, said plunger-engaging means being movable upward and actuated by such upward movement to engage said plunger, and said releasing means being operated by the downward movement of said plunger-engaging means.

55. In a feeding machine, a reciprocable plunger provided with a rack and a pile-holding foot, an oscillatable arm, a dog pivoted on said arm, and means for moving said dog into engagement with said rack on one movement and out of engagement with said rack on its opposite movement.

56. In a feeding machine, a reciprocable plunger provided with a rack and a pile-holding foot, an oscillatable arm, a dog pivoted on said arm, means for moving said dog into engagement with said rack on one movement and out of engagement with said rack on its opposite movement, a guide for said plunger, said arm being pivoted on said guide, and means for raising and lowering said arm.

57. In a feeding machine, a reciprocable plunger, provided with a rack and a pile-holding foot, an oscillatable arm, a dog pivoted on said arm, means for moving said dog into engagement with said rack on one movement and out of engagement with said rack on its opposite movement, a guide for said plunger, said arm being pivoted on said guide, and means for raising and lowering said arm, said arm carrying a cam roller, a cam bar coöperatng with said cam roller and means operated by said machine for raising and lowering said cam bar.

58. In a feeding machine, parallel oscillatory arms, a bar pivotally connected at opposite ends to said arms, a rod, a box or slide on said rod, a plunger reciprocably mounted on said box or slide, and an arm pivotally mounted on said box or slide, said arm being provided with means engaging said plunger on its upward movement and releasing said plunger on its downward movement.

CARL E. CHRISTOPHEL.

Witnessed by—
 MABEL BARRY,
 FRANK B. LOCKTON.